United States Patent
Wu et al.

[11] Patent Number: 5,958,992
[45] Date of Patent: Sep. 28, 1999

[54] BLOWING AGENT BLENDS

[75] Inventors: Jinhuang Wu, King of Prussia; Douglas R. Dillon, Norristown; Richard M. Crooker, Fogelsville, all of Pa.

[73] Assignee: Elf Atochem North America, Inc., Philadelphia, Pa.

[21] Appl. No.: 09/198,872

[22] Filed: Nov. 24, 1998

[51] Int. Cl.$^6$ ...................................................... C08J 9/04
[52] U.S. Cl. .................. 521/131; 252/182.2; 252/182.4; 510/415; 521/155; 521/170; 521/174; 568/700
[58] Field of Search ..................................... 521/131, 155, 521/170, 174; 510/415; 252/182.2, 182.24; 568/700

[56] References Cited

U.S. PATENT DOCUMENTS

| | | | |
|---|---|---|---|
| 4,789,690 | 12/1988 | Milooanovic-Lerik et al. | 521/174 |
| 4,945,119 | 7/1990 | Smits et al. | 521/131 |
| 4,972,003 | 11/1990 | Grunbauer et al. | 521/131 |
| 5,182,311 | 1/1993 | Patterson et al. | 521/131 |
| 5,283,003 | 2/1994 | Chen | 252/182.2 |
| 5,451,615 | 9/1995 | Birch | 521/132 |
| 5,484,817 | 1/1996 | Patterson | 521/131 |

OTHER PUBLICATIONS

RD 40137, pp. 606–609, Sep. 1997.
"Dupont Program on Fluorocarbon Alternative Blowing Agents for Polyurethane Foams", Dishart et al., Oct. 1987.
Heilig et al.; "Pentane Blown Rigid Foam", Dec. 1993.
Nelson; "Findings of the CFC Chem. Substitutes Int'l. Committee"; EPA/600/9–88/009, Apr. 1988.

*Primary Examiner*—John M. Cooney, Jr.

[57] ABSTRACT

Foam blowing agents blends of 10–90% of n- and/or i-pentane with 90–10% of 142b or 124 are provided, as are polyol premixes and polyurethane foam compositions containing such blends.

20 Claims, No Drawings

BLOWING AGENT BLENDS

BACKGROUND OF THE INVENTION

This invention relates to foam blowing agent blends of (a) n- and/or i-pentane with (b) 1-chloro-1,1-difluoroethane ("142b") or 2-chloro-1,1,1,2-tetrafluoroethane ("124"), more particularly to blends containing about 10–90 weight % of each of (a) and (b) and to polyol premixes and polyurethane foam compositions containing such blends.

Until now, the leading polyurethane foam blowing agent has been 1,1-dichloro-1-fluoroethane ("141b"), in order to meet the market place requirements for energy, fire performance and cost. At the same time, however, 141b has a high ozone depletion potential ("ODP") of about 0.1. Thus, many foam manufacturers are now investigating cyclopentane as a leading alternative candidate to replace 141b. Cyclopentane has zero ODP, but also has property shortcomings in terms of fire performance and aged k-factor performance (and thus, thermal insulating properties).

It would therefore be useful to provide the industry with a foam blowing agent which overcomes the deficiencies of both 141b and cyclopentane in terms of properties such as ODP, fire performance, k-factor aging and the like.

While articles have been written on the subject of blended blowing agents, such as Research Disclosure 40137 (September 1997) on Hydrochlorofluorocarbon-hydrocarbon Mixtures, the actual data presented is that of blends containing the industry standard, 141b.

BRIEF SUMMARY OF THE INVENTION

Foam blowing agent compositions are provided, which compositions comprise (a) about 10–90 weight % (preferably 60–80%) of n-pentane, i-pentane or mixtures thereof and (b) about 90–10 weight % (preferably 40–20%) of 142b or 124, as well as foam premix compositions, which premix compositions comprise a polyol and the foregoing blowing agent blend, and polyurethane foam compositions, which foam compositions comprise an A-side containing an isocyanate and a B-side containing a polyol and all or a portion of the foregoing blowing agent blend (a portion of the pentane component of the blend preferably being incorporated into the A-side).

DETAILED DESCRIPTION

It has now been found that the foregoing blends of n-pentane and/or i-pentane with 142b or 124 overcome deficiencies associated with 141b or cyclopentane. Thus, relative to 141b, the inventive blends have low ODPs by virtue of the low ODPs of their components, 0 for n-pentane and i-pentane, 0.05 for 142b and 0.02 for 124. Relative to cyclopentane, the use of at least 10% halocarbon (142b or 124) improves the fire performance properties, so that less fire retardant is needed, and provides foams which not only match the initial k-factor of cyclopentane, but surprisingly have a slower aging rate which results in improved thermal insulating properties. The blends also provide advantages in terms of better compressive strength than cyclopentane; better solubility than pure hydrocarbon; less VOC (volalite organic compound) than pure hydrocarbon; and better dimensional stability due to the combination of the high boiling point pentanes and the low boiling point halocarbons.

In the premix compositions, the blowing agent blend is typically present in a concentration range of about 2–60 weight % (preferably 10–40 weight %), based on the weight of the polyol.

In the polyurethane foam compositions, the effective concentrations of the blends are typically about 0.1–25 weight % (preferably 0.5–15%) based on the weight of the total polyurethane foam formulation. In order to help solubilize the blowing agent blend in the polyurethane foam composition, a portion of the pentane component (typically about 50–75%) of the blend is preferably added to the A-side. This also helps to assure that the A-side and the B-side have similar viscosities.

The other components of the premix and foam formulations may be those which are conventionally used, which components and their proportions are well known to those skilled in the art. For example, catalysts, fire retardants and surfactants are typical components of the B-side. Some examples of typical components and mixing procedures are set forth in the Research Disclosure paper referenced above.

The practice of the invention is illustrated in more detail in the following non-limiting examples of n-pentane/142b and n-pentane/124 blown foams in comparison to a cyclopentane blown foam. The formulations used (all having an Iso Index of 300) are set forth in Table I, all listed materials being commercially available. In Table I, M-489 stands for polymeric methane diphenyl diisocyanate, available from Bayer Corporation; T-2541 is a polyester polyol having a hydroxyl number of 240, available from Hoechst Celanese; PC-5 and PC-46 are, respectively, pentamethyldiethylenetri-amine and potassium acetate in ethylene glycol, catalysts available from Air Products; K-15 is potassium octoate in dipropylene glycol, a catalyst available from Air Products; B-8462 is a polysiloxane-polyether copolymer, a surfactant available from Goldschmidt Chemical Corporation; and AB-80 is tris(1-chloro-2-propyl)phosphate, a fire retardant available from Albright & Wilson Americas, Inc; all parts are by weight. A-side premix components, containing isocyanate and 75% of the pentane, were mixed and cooled to 10° C. B-side premix components, containing polyol, surfactant, fire retardant, 25% of the pentane and 100%. of any halocarbon, were also mixed and cooled to 10° C.

TABLE I

| Component | Example 1 (n-pentane/ 142b) | Example 2 (n-pentane/ 124) | Comparative Example (Cyclopentane) |
| --- | --- | --- | --- |
| M-489 | 170.51 | 170.51 | 170.51 |
| n-pentane | 19.05 | 21.05 | — |
| Cyclo-pentane | — | — | 24.08 |
| T-2541 | 100.00 | 100.00 | 100.00 |
| PC-5 | 0.13 | 0.13 | 0.13 |
| PC-46 | 0.44 | 0.44 | 0.44 |
| K-15 | 3.92 | 3.92 | 3.92 |
| B-8462 | 4.32 | 4.32 | 4.32 |
| AB-80 | 15.00 | 15.00 | 15.00 |
| 142b | 6.36 | — | — |
| 124 | — | 7.04 | — |

In making the foam, the A and B side premixes were mixed for 10 seconds, followed by injection of the catalyst mixture. Mixing is continued for 15 seconds, after which the mixture is poured into a box.

ASTM procedures were then followed to measure (initial and aged) k-factors (ASTM C518) and compressive strengths (ASTM D1621) of the resultant foams, all of which had a density of 1.8 pounds per cubic foot. The results are shown in Tables II and III:

TABLE II

| | K-factors (in BTU.in/ft$^2$.hr. °F.) | | |
| --- | --- | --- | --- |
| | Example 1 | Example 2 | Comparative Example |
| Initial | 0.160 | 0.161 | 0.160 |
| After 8 weeks | 0.182 | 0.182 | 0.189 |

TABLE III

| | Compressive Strength (psi) | | |
| --- | --- | --- | --- |
| | Example 1 | Example 2 | Comparative Example |
| Parallel | 27.6 | 32.3 | 26.3 |
| Perpendicular | 17.5 | 18.9 | 10.5 |

We claim:

1. A foam blowing agent composition comprising (a) about 10 to 90 weight % of a pentane selected from the group consisting of one or more of n-pentane and i-pentane and (b) about 90 to 10 weight % of a halocarbon selected from the group consisting of 142b (1-chloro-1,1-difluoroethane) and 124 (2-chloro-1,1,1,2-tetrafluoroethane).

2. A foam blowing agent composition comprising (a) about 10 to 90 weight % of a pentane selected from the group consisting of one or more of n-pentane and i-pentane and (b) about 90 to 10 weight % of 142b.

3. A foam blowing agent composition comprising (a) about 10 to 90 weight % of a pentane selected from the group consisting of one or more of n-pentane and i-pentane and (b) about 90 to 10 weight % of 124.

4. A foam blowing agent composition comprising (a) about 10 to 90 weight % of n-pentane and (b) about 90 to 10 weight % of a halocarbon selected from the group consisting of 142b and 124.

5. A foam blowing agent composition comprising (a) about 10 to 90 weight % of i-pentane and (b) about 90 to 10 weight % of a halocarbon selected from the group consisting of 142b and 124.

6. A foam premix composition comprising a polyol and the foam blowing agent composition of claim 1.

7. A foam premix composition comprising a polyol and the foam blowing agent composition of claim 2.

8. A foam premix composition comprising a polyol and the foam blowing agent composition of claim 3.

9. A foam premix composition comprising a polyol and the foam blowing agent composition of claim 4.

10. A foam premix composition comprising a polyol and the foam blowing agent composition of claim 5.

11. A polyurethane foam composition comprising an isocyanate, a polyol and the foam blowing agent composition of claim 1, said foam composition having (a) an A-side which contains the isocyanate and, optionally, a portion of the pentane component of the foam blowing agent composition and (b) a B-side which contains the polyol and the balance of the foam blowing agent composition.

12. The polyurethane foam composition of claim 11 wherein a portion of the pentane is contained in the A-side.

13. A polyurethane foam composition comprising an isocyanate, a polyol and the foam blowing agent composition of claim 2, said foam composition having (a) an A-side which contains the isocyanate and, optionally, a portion of the pentane component of the foam blowing agent composition and (b) a B-side which contains the polyol and the balance of the foam blowing agent composition.

14. The polyurethane foam composition of claim 13 wherein a portion of the pentane is contained in the A-side.

15. A polyurethane foam composition comprising an isocyanate, a polyol and the foam blowing agent composition of claim 3, said foam composition having (a) an A-side which contains the isocyanate and, optionally, a portion of the pentane component of the foam blowing agent composition and (b) a B-side which contains the polyol and the balance of the foam blowing agent composition.

16. The polyurethane foam composition of claim 15 wherein a portion of the pentane is contained in the A-side.

17. A polyurethane foam composition comprising an isocyanate, a polyol and the foam blowing agent composition of claim 4, said foam composition having (a) an A-side which contains the isocyanate and, optionally, a portion of the pentane component of the foam blowing agent composition and (b) a B-side which contains the polyol and the balance of the foam blowing agent composition.

18. The polyurethane foam composition of claim 17 wherein a portion of the pentane is contained in the A-side.

19. A polyurethane foam composition comprising an isocyanate, a polyol and the foam blowing agent composition of claim 5, said foam composition having (a) an A-side which contains the isocyanate and, optionally, a portion of the pentane component of the foam blowing agent composition and (b) a B-side which contains the polyol and the balance of the foam blowing agent composition.

20. The polyurethane foam composition of claim 19 wherein a portion of the pentane is contained in the A-side.

* * * * *